J. E. Evarts,
Coffin,
N° 80,816.　　　Patented Aug. 11, 1868.

Witnesses　　　　　　　　　　　　　　Inventor.
Henry R. Wilcox　　　　　　　　　　Jefferson E. Evarts
Lewis R. Evarts　　　　　　　　　　By his atty.

United States Patent Office.

JEFFERSON E. EVARTS, OF MADISON, CONNECTICUT.

Letters Patent No. 80,816, dated August 11, 1868.

IMPROVED COFFIN.

The Schedule referred to in these Letters Patent and making part of the same.

TO ALL WHOM IT MAY CONCERN:

Be it known that I, JEFFERSON E. EVARTS, of the town of Madison, county of New Haven, and State of Connecticut, have invented a new and improved Coffin; and I do hereby declare the following to be a full, clear, and exact description of the same, reference being had to the annexed drawings, making a part of this specification, in which—

Figure 1:
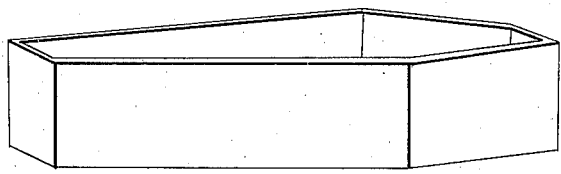

Figure 1 represents the box or body of the coffin, and

Figure 2:
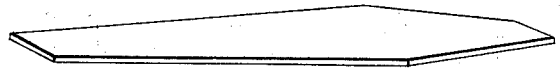
Figure 3:
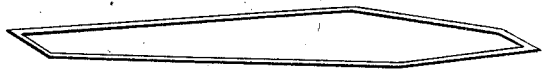

Figure 2 the lid to the same.

The nature of my invention consists in making coffins of papier-mache, a substance which is absolutely imperishable, being in nowise affected by any weather, temperature, or soil, and capable of resisting the action of acids.

I hereby disclaim to have invented the substance or substances composing said coffin.

What I claim as my invention, and desire to secure by Letters Patent, is—

The application of the substance known as papier-mache, to be used in the construction and manufacture of coffins, substantially as and for the purpose above specified.

Dated at Madison, this 20th day of April, A. D. 1868.

JEFFERSON E. EVARTS. [L. S.]

Witnesses:
  LUCIUS B. TUTTLE,
  D. E. SMITH.